Nov. 28, 1950  J. E. BANCROFT  2,531,962
COIL WINDING MACHINE

Filed April 2, 1946  4 Sheets-Sheet 1

INVENTOR.
JAMES E. BANCROFT
BY
Kenyon & Kenyon
ATTORNEYS

INVENTOR.
JAMES E. BANCROFT
BY
Kenyon & Kenyon
ATTORNEYS

Nov. 28, 1950 J. E. BANCROFT 2,531,962
COIL WINDING MACHINE
Filed April 2, 1946 4 Sheets-Sheet 3

INVENTOR.
JAMES E. BANCROFT
BY
Kenyon + Kenyon
ATTORNEYS

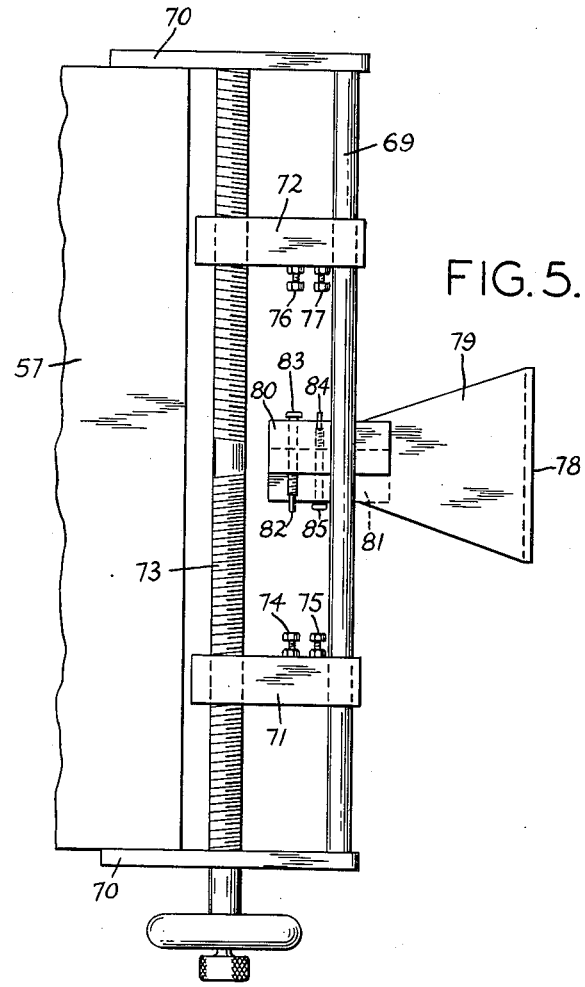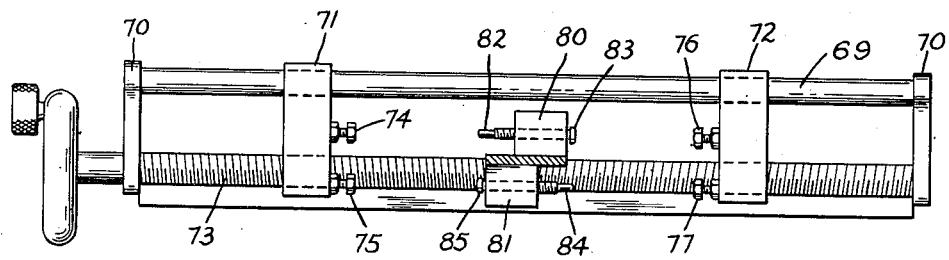

Patented Nov. 28, 1950

2,531,962

UNITED STATES PATENT OFFICE 2,531,962

COIL WINDING MACHINE

James E. Bancroft, Jamaica, N. Y., assignor, by mesne assignments, to Allied Control Company, Inc. (1947), a corporation of New York Application April 2, 1946, Serial No. 658,906

23 Claims. (Cl. 242—9)

1

This invention relates to coil-winding machines.

An object of this invention is a coil-winding machine of simple construction which can be easily and quickly adjusted to wind different diameter wires and to wind coils of different lengths.

A coil-winding machine according to this invention consists of a rotatable mandrel which supports one or more bobbins, a first carriage supported for reciprocation parallel to said mandrel and a second carriage supported for reciprocation toward and away from the mandrel. Suitable wire-guiding mechanism is attached to the first carriage for movement therewith to direct the wire back and forth along the bobbins. The second carriage supports a pair of worm wheels in mesh with a pair of feed screws extending perpendicular to the mandrel, the direction of rotation of the feed screws being so related to the threads thereof that with one worm wheel held against rotation, the second carriage moves toward said mandrel and that with the other worm wheel held against rotation the second carriage moves away from said mandrel. Means, including a pair of solenoids, are provided for selectively holding the worm wheels against rotation. The first carriage adjustably supports a bar having a slot arranged transverse to the path of movement of the first carriage. A stud mounted on the second carriage extends into said slot so that reciprocation of the second carriage effects reciprocation of the first carriage parallel to the mandrel. Suitable wire feeding means are connected to the first carriage for reciprocation therewith. The mandrel and feed screws are rotated by a motor controlled by limit switches actuated by said last-mentioned carriage. The length of a coil wound by the machine may be varied by adjustment of the limit switches and the machine may be adjusted for different size wires by changing the angularity of the slot with respect to the path of movement of the first carriage, the angularity of the slot being such that the wire-feeding mechanism is moved axially of the mandrel a distance equal to the wire diameter for each complete revolution of the mandrel.

Other objects, novel features and advantages of this invention will become apparent from the following specification and accompanying drawings, wherein.

2

Figure 1:
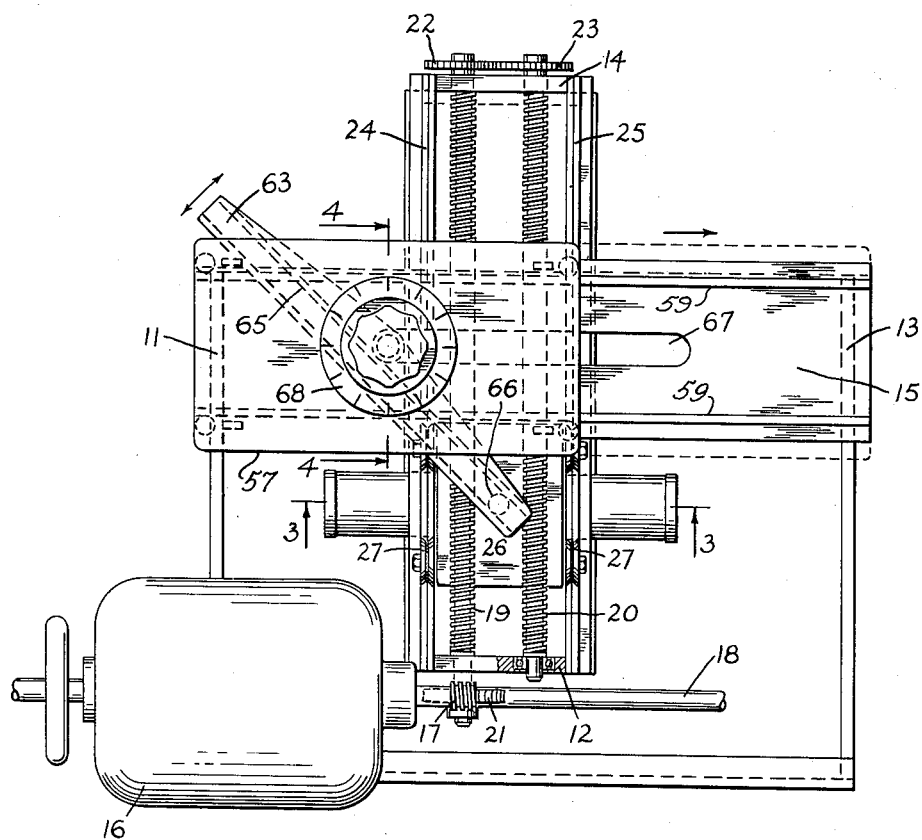
Fig. 1 is a plan view with a portion omitted of a coil-winding machine embodying the invention.
Figure 3:
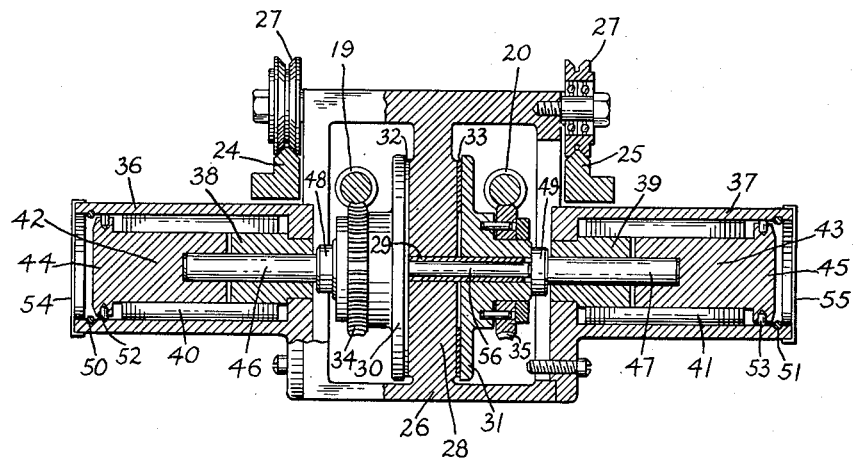
Figure 4:
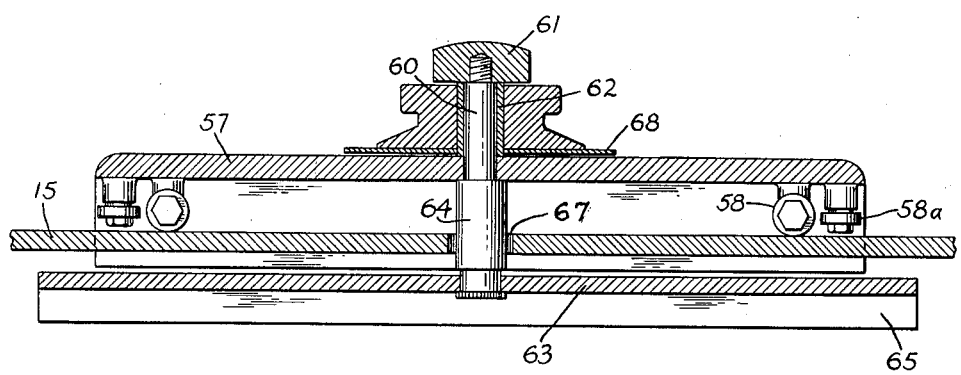

Fig. 3 is a section on the line 3—3 of Fig. 1;

Fig. 4 is a section on the line 4—4 of Fig. 1 with the parts in different arrangement than shown in Fig. 1;

Fig. 5 is a fragmentary plan view of the machine showing the portion omitted from Fig. 1, and Fig. 6 is an elevation of Fig. 5.

A bed 10 supports a plurality of risers 11, 12, 13 and 14 with a bridge 15 spanning the risers 11 and 13. A motor 16 is supported by the bed 10 and an extension of the motor shaft carries a worm gear 17. A mandrel 18 is suitably attached to the motor shaft extension for rotation therewith. Two feed screws 19 and 20 are journalled at their opposite ends in the risers 12 and 14 and extend perpendicular to the mandrel axis. The feed screw 19 carries a worm wheel 21 in mesh with the worm gear 17 and carries a spur gear 22 in mesh with a spur gear 23 carried by the feed screw 20. The feed screws 19 and 20 are rotated in opposite directions by the gearing, the motor 16 furnishing the driving forces and the threads of the two screws are identical and run in the same direction.

Two rails 24 and 25 extend parallel to the feed screws between the risers 12 and 14. A carriage 26 is equipped with four wheels 27, two of which ride on the rail 24 and two of which ride on the rail 25. The carriage 26 includes a vertical partition 28 in which is fixed a horizontal sleeve 29. Two disks 30 and 31 are slidably journalled on the sleeve 29 at opposite sides of the partition 28 which is provided with a pair of friction members 32 and 33 adapted for engagement by the disks 30 and 31 as subsequently to be described. Two worm wheels 34 and 35 are carried by the disks 30 and 31 respectively in mesh with the feed screws 19 and 20 respectively.

The carriage 26 supports two magnetic metal housings 36 and 37 within which are arranged magnetic metal stationary cores 38 and 39 having central passageways in axial alinement with the sleeve 29. Electromagnetic coils 40 and 41 surround the cores 38 and 39 and in the coils are reciprocably arranged movable cores 42 and 43 having circular heads 44 and 45 of slightly less diameter than the inner surface of the housings 36 and 37. Plungers 46 and 47 are attached to the movable cores 42 and 43 and extend through the stationary cores 38 and 39 and are provided with heads 48 and 49. Outward movement of the cores 42 and 43 is limited by snap rings 50 and 51 arranged in the ends of the housings 36 and 37 while inward movement of the cores 42 and 43 is limited by engagement with the hubs of the disks 30 and 31 respectively. The heads 44 and 45 are provided with radially arranged brass pins 52 and 53 to provide a uniform air gap between the periphery of the heads 44 and 45 and the inner surfaces of the housings 36 and 37. Caps 54 and 55 close the housings 36 and 37 respectively. A rod 56 of slightly greater length than the sleeve 29 is slidably mounted therein. Upon energization of the coil 40 with the coil 41 de-energized, the core 42 and plunger 46 are moved to the right to push the disk 30 into engagement with the friction material 32 to thereby lock the disk 30 and worm wheel 34 against rotation. Also, the plunger 46 pushes the rod 56 to the right to move the plunger 47 and core 43 to the right, thereby disengaging the head 49 from the disk 31 to free the latter from the friction material 33 for rotation. De-energization of the coil 40 and energization of the coil 41 effects reverse operation. The energization of either coil with the other coil de-energized results in one of the two worm wheels 34 and 35 being held against rotation with the other free for rotation.

A second carriage 57 is movably supported by the bridge 15 through the medium of rollers 58 engaging the top of the bridge. The bridge 15 carries rails 59 parallel to the mandrel axis and the carriage 57 is equipped with a plurality of rollers 58a engaging the sides of the rails so that the carriage 57 is supported by the bridge 15 for reciprocation parallel to the mandrel axis. A shaft 60 is journalled in the carriage 57 and is provided at its upper end with a button 61. A spacer sleeve 62 surounding the shaft 60 is interposed between the button 61 and the carriage 57. A bar 63 is fixed to the shaft 60 with a spacer sleeve 64 interposed between it and the carriage 57. The bar 63 is adjustable by rotation of the button 61 and is provided with a straight slot 65 in its under face in which is received the end of a stud 66 carried by the carriage 26. A slot 67 is provided in the bridge 15 to receive the spacer 64 and a dial 68 is attached to the button 61. By reason of the engagement of the stud 66 in the slot 65, reciprocation of the carriage 26 effects reciprocation of the carriage 57 parallel to the mandrel axis. For simplicity, the bar 63 is shown with the slot 65 perpendicular to the rails 24 and 25 in Fig. 2 and parallel to said rails in Fig. 4 rather than oblique to said rails as in Fig. 1 which illustrates the operating position of the bar.

Figure 2:
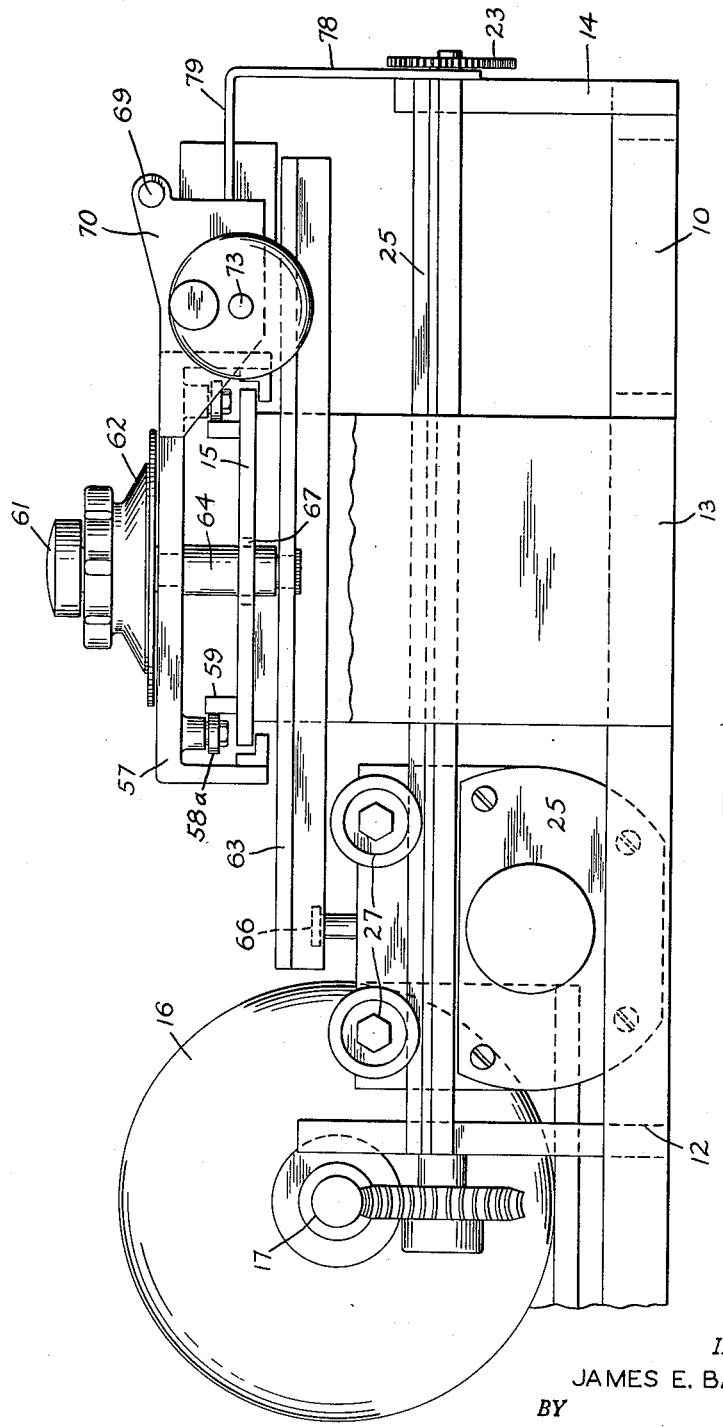
Fig. 2 is a side elevation of Fig. 1.

As shown in Figs. 2, 5 and 6, but not in Fig. 1, a rod 69 extends between plates 70 fixed to the ends of the carriage 57 and slidably supports two blocks 71 and 72. A feed screw 73 is journalled in the plates 70 and extends through the blocks 71 and 72. One half of the feed screw 73 has a right-hand thread while the other half has a left-hand thread so that rotation of the feed screw 73 causes movement of the blocks 71 and 72 either toward or away from each other. The block 71 is provided with a pair of adjustable abutment members 74 and 75 while the block 72 is provided with a pair of adjustable abutment members 76 and 77. A bracket 78 supported by the bed 10 has an inwardly directed portion 79 to the top and bottom of which are connected snap switches 80 and 81 in series respectively with the coils 40 and 41. The snap switch 80 is provided with a plunger 82 adapted for engagement by the abutment 74 and a plunger 83 adapted for engagement by the abutment member 76 while the switch 81 is provided with a plunger 84 adapted for engagement with the abutment 77 and a plunger 85 adapted for engagement by the abutment 75. The switches 80 and 81 are of such design that with the plungers 82 and 84 in their outermost positions the switches are opened and with the plungers 82 and 84 in their innermost positions the switches are closed and the plungers remain in their innermost positions until the plungers 83 and 85 are pushed in, whereupon the plungers 82 and 84 are released to permit the switches to open automatically. The abutments 74, 75, 76 and 77 are so arranged that that abutment 74 will engage and operate the plunger 82 before the abutment 75 engages and operates the plunger 85 while the arrangement of the abutments 76 and 77 is such that the abutment 77 will engage and operate the plunger 84 before the abutment 76 engages and operates the plunger 83. Therefore, the energized solenoid remains energized until after the de-energized solenoid is energized, whereupon energization of the two coils is reversed.

When the above-described apparatus is used for winding bobbin coils, one or more bobbins (not shown) are supported by the mandrel for rotation therewith. The wire to be wound on each bobbin is guided thereto by mechanism, not herein shown, connected to the carriage 57 for movement in unison therewith. Upon rotation of the mandrel 18, the carriage 26 is caused to move toward or away from the mandrel depending upon which of the two worm wheels 34 and 35 is held stationary by energization of its associated solenoid. The carriage 57 is caused to reciprocate parallel to the mandrel a predetermined distance for each to and fro movement of the carriage 26 and the extent of movement of the carriage 57 depends upon the extent of movement of the carriage 26 as well as the angularity of the slot 65 with respect to the path of the carriage 26. By reason of the fact that the switch plungers 82 and 84 are operated slightly in advance of the plungers 83 and 85, the direction of travel of the carriage 26 is reversed instantaneously upon the operation of either the plungers 83 or 85. Also, the plunger of the de-energized solenoid is immediately moved back from its clamping position by reason of pressure exerted thereon through the rod 56 from the plunger of the energized solenoid.

The arm 63 is set at such angularity of the groove 65 with respect to the path of the carriage 26 that for each complete revolution of the mandrel 18, the carriage 57 is advanced an extent equal to the thickness of the diameter of the wire being wound on the bobbins. The blocks 71 and 72 are so adjusted that the carriage 57 travels back and forth along a path equal to the distance between the flanges of a bobbin. When it is desired to set up the machine to wind a bobbin of different length, the blocks 71 and 72 are adjusted relative to each other to change the length of the path of the carriage 57 to equal the new bobbin length. When it is desired to adjust the machine for winding a different diameter wire, the bar 63 is adjusted to change the angularity of the slot 65 so that the carriage 57 moves a distance equal to the new wire diameter for each complete rotation of the mandrel. The dial 68 is provided with indicia to indicate the proper setting of the bar 63 for different diameter wires.

Although the machine has been described in its embodiment for winding bobbin coils, it may equally well be used for the winding of feed coils or the winding of thread, string or other textile. Furthermore, it is to be understood that various modifications may be made in the above-described structure without in any way departing from the spirit of the invention as defined in the appended claims.

I claim:

1. A coil winding machine comprising a rotatable mandrel, a first carriage supported for reciprocation parallel to said mandrel, a second carriage supported for reciprocation perpendicular to said mandrel, means interconnecting said carriages to effect reciprocation of said first carriage upon reciprocation of the second carriage, a pair of feed screws extending perpendicular to said mandrel, a pair of worm wheels rotatably supported by said second carriage in engagement with said feed screws, means for selectively clamping said worm wheels against rotation, and means for rotating said mandrel and said feed screws, the direction of rotation of said feed screws being so related to the threads thereof that with one worm wheel held against rotation said second carriage moves toward said mandrel and with the other worm wheel held against rotation said second carriage moves away from said mandrel.

2. A coil winding machine according to claim 1 characterized by the means connecting said carriages being adjustable to vary the extent of movement of said first carriage for a predetermined extent of movement of said second carriage.

3. A coil winding machine according to claim 1 characterized by the means interconnecting said carriages comprising a member adjustably supported by one carriage and having a groove therein, said member being so adjusted that said groove may be positioned at selectable angles to the path of movement of said one carriage, and a pin mounted on the remaining carriage and projecting into said groove.

4. A coil winding machine according to claim 1 characterized by said means interconnecting said carriages comprising a member adjustably supported by said first carriage and having a groove therein, said member being so adjustable that said groove may be positioned at selectable angles to the path of movement of said first carriage, and a pin mounted on said second carriage and projecting into said groove.

5. A coil winding machine according to claim 1 characterized by electromagnetic means for actuating said clamping means.

6. A coil winding machine according to claim 1 characterized by two solenoids each having a plunger coaxial with one worm wheel for movement into engagement therewith upon energization of the solenoid.

7. A coil winding machine comprising a rotatable mandrel, a first carriage supported for reciprocation parallel to said mandrel, a second carriage supported for reciprocation perpendicular to said mandrel, means interconnecting said carriages to effect reciprocation of said first carriage upon reciprocation of the second carriage, a pair of alined worm wheels rotatably supported by said second carriage, means including a pair of solenoids selectively to lock said worm wheels against rotation, a pair of feed screws extending perpendicular to said mandrel with each screw in mesh with one worm wheel, and means for rotating said mandrel and said feed screws, the direction of rotation of said feed screws being so related to the threads thereof that the second carriage moves toward said mandrel with one worm wheel held against rotation and moves away from said mandrel with the other worm wheel held against rotation.

8. A coil winding machine according to claim 7 characterized by means for selectively energizing said solenoids upon a predetermined extent of travel of said first carriage.

9. A coil winding machine comprising a rotatable mandrel, a first carriage supported for reciprocation parallel to said mandrel, a second carriage supported for reciprocation perpendicular to said mandrel, means interconnecting said carriages to effect reciprocation of said first carriage upon reciprocation of the second carriage, a pair of alined worm wheels rotatably supported by said second carriage, friction means engageable by each worm wheel, a solenoid individual to each worm wheel and having a plunger engageable therewith to force it against said friction means, a pair of feed screws extending perpendicular to said mandrel with each screw in mesh with one worm wheel, and means for rotating said mandrel and said feed screws, the direction of rotation of said feed screws being so related to the threads thereof that the second carriage moves toward said mandrel with one worm wheel held against rotation and moves away from said mandrel with the other worm wheel held against rotation.

10. A coil winding machine according to claim 9 characterized by means for selectively energizing said solenoids upon a predetermined extent of travel of said first carriage.

11. A coil winding machine comprising a rotatable mandrel, a first carriage supported for reciprocation parallel to said mandrel, a member adjustably supported by said first carriage and having a groove therein, said member being so adjusted that said groove may be positioned at selectable angles to the path of movement of said first carriage, a second carriage supported for reciprocation perpendicular to said mandrel, a pin mounted on said second carriage and projecting into said groove, a pair of feed screws extending perpendicular to said mandrel, a pair of worm wheels rotatably supported by said second carriage in engagement with said feed screws, means for selectively clamping said worm wheels against rotation, and means for rotating said mandrel and said feed screws, the direction of rotation of said feed screws being so related to the threads thereof that with one worm wheel held against rotation said second carriage moves toward said mandrel and with the other worm wheel held against rotation said second carriage moves away from said mandrel.

12. A coil winding machine according to claim 11 characterized by two solenoids each having a plunger coaxial with one worm wheel for movement into engagement therewith upon energization of the solenoid.

13. A coil winding machine comprising a rotatable mandrel, a first carriage supported for reciprocation parallel to said mandrel, a second carriage supported for reciprocation perpendicular to said mandrel, a member adjustably supported by one carriage and having a groove therein, said member being so adjustable that said groove may be positioned at selectable angles to the path of movement of said first carriage, a pin mounted on the other carriage and projecting into said groove, a pair of alined worm wheels rotatably mounted on said second carriage, a pair of feed screws extending perpendicular to said mandrel with each screw in mesh with one worm wheel, and means for continuously rotating said feed screws, the direction of rotation of said feed screws being so related to the threads thereof that the second carriage moves toward said mandrel with one worm wheel held against rotation and moves away from said mandrel with the other worm wheel held against rotation.

14. A coil winding machine comprising a rotatable mandrel, a first carriage supported for reciprocation parallel to said mandrel, a second carriage supported for reciprocation perpendicular to said mandrel, means interconnecting said carriages to effect reciprocation of said first carriage upon reciprocation of the second carriage, a pair of alined worm wheels rotatably supported by said second carriage, friction means engageable by each worm wheel, a solenoid individual to each worm wheel having a plunger engageable therewith to force it against said friction means, a bar coaxial with said screws arranged between said plungers to prevent simultaneous engagement of the plungers with the worm wheels, a pair of feed screws extending perpendicular to said mandrel with each screw in mesh with one worm wheel, and means for rotating said mandrel and said feed screws, the direction of rotation of said feed screws being so related to the threads thereof that the second carriage moves toward said mandrel with one worm wheel held against rotation and moves away from said mandrel with the other worm wheel held against rotation.

15. A coil winding machine according to claim 7 characterized by a limit switch in circuit with each solenoid, and means movable with said first carriage for selectively operating said switches upon a predetermined extent of movement of said first carriage.

16. A coil winding machine according to claim 9 characterized by a limit switch in circuit with each solenoid, and means movable with said first carriage for selectively operating said switches upon a predetermined extent of movement of said first carriage.

17. A coil winding machine comprising a rotatable mandrel adapted to receive a coil structure to be wound, a first carriage supported for reciprocation for feeding windings to said coil structure, a second carriage supported for reciprocation, means interconnecting said carriages to effect reciprocation of said first carriage upon reciprocation of said second carriage, means for reciprocating said second carriage comprising a pair of feed screws, a pair of worm wheels rotatably supported by said second carriage for engagement each with one of said feed screws, means for selectively clamping said worm wheels against rotation, and means for rotating said feed screws, the direction of rotation of said feed screws being so related to the threads thereof that with one worm wheel held against rotation, said second carriage moves in one direction and with the other worm wheel held against rotation said second carriage moves in the other direction.

18. A coil winding machine according to claim 17 including means responsive to the reciprocation of said first carriage for alternately clamping said worm wheels against rotation.

19. A coil winding machine according to claim 17 characterized by the means connecting said carriages being adjustable to vary the extent of reciprocation of said first carriage for a predetermined extent of reciprocation of said second carriage.

20. A coil winding machine according to claim 17, characterized by electromagnetic means for actuating said clamping means.

21. A coil winding machine according to claim 17 wherein said clamping means comprises a pair of solenoids each having a plunger coaxial with one worm wheel for movement into engagement therewith upon energization of the solenoid.

22. A coil winding machine according to claim 21, including means responsive to the reciprocation of said first carriage for alternatively energizing said solenoids.

23. A coil winding machine as in claim 17 wherein said clamping means comprises a pair of solenoids each having a plunger adapted upon energization of the corresponding solenoid to engage one of said worm wheels and means operated by said plunger upon energization of the corresponding solenoid for freeing the other worm wheel for rotation.

JAMES E. BANCROFT.

REFERENCES CITED

The following references are of record in the file of this patent:

UNITED STATES PATENTS

| Number | Name | Date |
|---|---|---|
| 1,117,620 | Adams | Nov. 17, 1914 |
| 1,367,999 | Thronsen | Feb. 8, 1921 |
| 1,413,366 | Treanor | Apr. 18, 1922 |
| 1,764,618 | Franks | June 17, 1930 |
| 2,169,351 | Bednarek | Aug. 15, 1939 |